(12) United States Patent
Li

(10) Patent No.: US 11,863,842 B2
(45) Date of Patent: Jan. 2, 2024

(54) METHOD AND APPARATUS FOR PROCESSING AUDIO AND VIDEO, ELECTRONIC DEVICE AND STORAGE MEDIUM

(71) Applicant: Beijing Baidu Netcom Science Technology Co., Ltd., Beijing (CN)

(72) Inventor: Minglu Li, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/879,421

(22) Filed: Aug. 2, 2022

(65) Prior Publication Data
US 2022/0377433 A1    Nov. 24, 2022

(30) Foreign Application Priority Data

Sep. 7, 2021    (CN) .......................... 202111044166.X

(51) Int. Cl.
*H04N 21/6587* (2011.01)
*H04N 21/8547* (2011.01)

(52) U.S. Cl.
CPC ..... *H04N 21/6587* (2013.01); *H04N 21/8547* (2013.01)

(58) Field of Classification Search
CPC ........... H04N 21/6587; H04N 21/8547; H04N 21/2368; H04N 21/4307; H04N 21/4341; H04N 21/439; H04N 21/44; H04N 21/44004; H04N 21/42607
See application file for complete search history.

(56) References Cited

U.S. PATENT DOCUMENTS 10,380,253 B2 * 8/2019 Ahmed ................. G06F 16/367
2014/0270703 A1    9/2014 Wang et al.
(Continued)

FOREIGN PATENT DOCUMENTS

CN    103412812 A    11/2013
CN    108737874 A    11/2018
(Continued)

OTHER PUBLICATIONS

Black et al., "Reifying Communication at the Application Level," *International Workshop Multimedia Middleware*, 2001. (4 pages).
(Continued)

*Primary Examiner* — Benjamin M Thieu
(74) *Attorney, Agent, or Firm* — Seed IP Law Group LLP

(57) ABSTRACT

A method and apparatus for processing an audio and video. The method includes: acquiring a target processing request including a target audio and video data stream; determining a target audio and video pipeline corresponding to the target processing request; the audio and video pipeline being constituted based on a plurality of functional components arranged in a chain structure, and the functional components being uniformly dispatched input data and recovered output data by a preset data stream dispatching module; and calling the target audio and video pipeline to continuously process the target audio and video data stream, and continuously outputting a processed audio and video data stream obtained after processing.

17 Claims, 4 Drawing Sheets

(56) References Cited

U.S. PATENT DOCUMENTS

| | | | | |
|---|---|---|---|---|
| 2015/0237101 A1* | 8/2015 | Perumanam | ....... | H04N 21/4433 |
| | | | | 709/219 |
| 2016/0134931 A1* | 5/2016 | Song | ................... | H04N 19/172 |
| | | | | 725/109 |
| 2016/0286260 A1 | 9/2016 | Lawrence et al. | | |

FOREIGN PATENT DOCUMENTS

| | | | |
|---|---|---|---|
| CN | 111147801 A | 5/2020 | |
| CN | 112665711 A | 4/2021 | |
| CN | 112887745 A | 6/2021 | |
| CN | 112995596 A | 6/2021 | |
| CN | 113242358 A | 8/2021 | |
| JP | 2015-156604 A | 8/2015 | |
| JP | 2015-525523 A | 9/2015 | |
| JP | 2018-195930 A | 12/2018 | |
| KR | 10-2014-0133891 A | 11/2014 | |

OTHER PUBLICATIONS

Blakowski et al., "A Media Synchronization Survey: Reference Model, Specification, and Case Studies," *IEEE Journal on Selected Areas in Communications,* 14, 1996. (31 pages).

Lohse et al., "Dynamic Distributed Multimedia: Seamless Sharing amd Reconfiguration of Multimedia Flow Graphs," *MUM,* 2003. (7 pages).

Chinese Office Action for Chinese Application No. 202111044166. X, dated May 27, 2022, 9 pages.

* cited by examiner

METHOD AND APPARATUS FOR PROCESSING AUDIO AND VIDEO, ELECTRONIC DEVICE AND STORAGE MEDIUM

CROSS-REFERENCE TO RELATED APPLICATIONS

This patent application claims the priority of Chinese Patent Application No. 202111044166.X, filed on Sep. 7, 2021, and entitled "Method and Apparatus for Processing Audio and Video, Electronic Device, Storage Medium and Program Product", the entire content of which is herein incorporated by reference.

TECHNICAL FIELD

The present disclosure relates to the technical field of data processing, in particular to the technical field of media cloud, and more particular to a method and apparatus for processing an audio and video, an electronic device, and a computer readable storage medium.

BACKGROUND

A mobile audio and video data processing framework is very different from data processing frameworks for processing other types of data. The audio and video processing framework must first be based on system capabilities provided by the mobile terminal, including a software framework and hardware capabilities defined at the system level.

Compared with other mobile application frameworks, the most special part of the audio and video framework is a pipeline part, because audio and video SDK (Software Development Kit) products are different from other products, and the first thing required is real-time processing, data streams are constantly shuttling between various functional components/modules.

SUMMARY

Embodiments of the present disclosure provide a method and apparatus for processing an audio and video, an electronic device, and a computer readable storage medium.

In a first aspect, an embodiment of the present disclosure provides a method for processing an audio and video. The method includes: acquiring a target processing request including a target audio and video data stream; determining a target audio and video pipeline corresponding to the target processing request; the audio and video pipeline being constituted based on a plurality of functional components arranged in a chain structure, and the functional components being uniformly dispatched input data and recovered output data by a preset data stream dispatching module; and calling the target audio and video pipeline to continuously process the target audio and video data stream, and continuously outputting a processed audio and video data stream obtained after processing.

In a second aspect, an embodiment of the present disclosure provides an apparatus for processing an audio and video. The apparatus includes: a request acquiring unit, configured to acquire a target processing request including a target audio and video data stream; a target pipeline determining unit, configured to determine a target audio and video pipeline corresponding to the target processing request; the audio and video pipeline being constituted based on a plurality of functional components arranged in a chain structure, and the functional components being uniformly dispatched input data and recovered output data by a preset data stream dispatching module; and a target pipeline calling and output returning unit, configured to call the target audio and video pipeline to continuously process the target audio and video data stream, and continuously output a processed audio and video data stream obtained after processing.

In a third aspect, an embodiment of the present disclosure provides an electronic device, including: at least one processor; and a memory communicatively connected to the at least one processor. The memory stores instructions executable by the at least one processor, and the instructions, when executed by the at least one processor, cause the at least one processor to perform the method for processing an audio and video according to any implementation in the first aspect.

In a fourth aspect, an embodiment of the present disclosure provides a non-transitory computer readable storage medium storing computer instructions. The computer instructions are used to cause the computer to perform the method for processing an audio and video according to any implementation in the first aspect.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

By reading the detailed description of non-limiting embodiments made with reference to the following accompanying drawings, other features, objectives and advantages of the present disclosure will become more apparent.

DETAILED DESCRIPTION OF EMBODIMENTS

Figure 1:
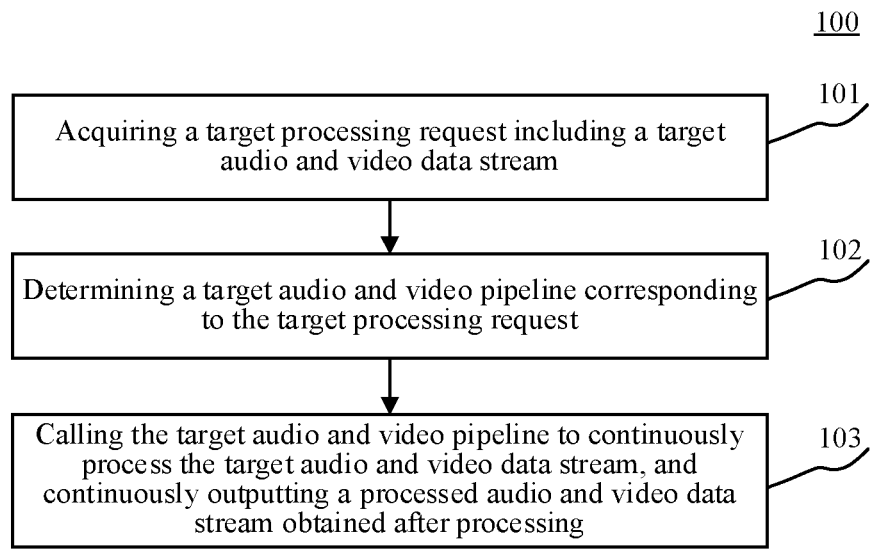
FIG. 1 is a flowchart of a method for processing an audio and video according to an embodiment of the present disclosure.

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description. It should be noted that the embodiments of the present disclosure and the features of the embodiments may be combined with each other on a non-conflict basis.

In the technical solution of the present disclosure, the collection, storage, use, processing, transmission, provision and disclosure of the user personal information involved are all in compliance with the relevant laws and regulations, and do not violate public order and good customs.

For ease of understanding, the present disclosure first describes an exemplary system architecture to which embodiments of a method and apparatus for processing an audio and video, an electronic device, and a computer readable storage medium of the present disclosure may be applied. An application object of the technical solution provided by the present disclosure is a mobile terminal, for example, mobile terminals with limited processing performance, such as smart phones, tablet computers, and smart glasses, aiming to provide a better processing solution for audio and video streams that need to be presented on a mobile terminal.

The mobile terminal may include an audio and video data producing module, an audio and video data processing module, and a processed data presentation module. The audio and video data producing module is configured to obtain the most original audio and video data by using a shooting component or a collection module, such as a camera, a pickup, a microphone set on a smartphone; the audio and video data processing module is configured to process data streams continuously input by the audio and video data producing module, and send processed data to the processed data presentation module to finally present the data to a user of the mobile terminal, such as a controller, an arithmetic unit, or a memory that exists in hardware, and an audio and video pipeline that exists in software or a virtual form; and the processed data presentation module is usually represented as a display screen, a speaker, a projection module, etc. on the mobile terminal.

Data processing and transmission may be performed between the above functional modules in a wired or wireless method, which will not be listed in detail herein.

The user may process a recorded audio and video data stream in real time through the mobile terminal, and view processed pictures and audios in real time. The various operations and processes mentioned above may be implemented by an application installed on the mobile terminal, so as to call the functional modules through the application, such as a photography application, an audio and video processing application.

The audio and video data processing module may process audio and video data by responding to a control instruction issued by an audio and video processing application, for example: first, acquiring a target processing request including a target audio and video data stream input by the audio and video data producing module; then, determining a target audio and video pipeline corresponding to the target processing request, the audio and video pipeline being constituted based on a plurality of functional components arranged in a chain structure, and the functional components being uniformly dispatched input data and recovered output data by a preset data stream dispatching module; and finally, calling the target audio and video pipeline to continuously process the target audio and video data stream, and continuously outputting a processed audio and video data stream obtained after processing to the processed data presentation module.

It should be noted that the target processing request including the target audio and video data stream may be acquired directly from the audio and video data producing module of the same mobile terminal, and may also be acquired through the network. In this case, the audio and video data producing module may also not be included in the mobile terminal.

It should be understood that the audio and video data producing module, the audio and video data processing module, and the processed data presentation module mentioned in the above content are only a schematic method of dividing the functional modules, and the dividing method may be adjusted according to actual needs.

With reference to FIG. 1, FIG. 1 is a flowchart of a method for processing an audio and video according to an embodiment of the present disclosure, and a flow 100 includes the following steps.

Step 101: acquiring a target processing request including a target audio and video data stream.

The purpose of this step is to acquire the target processing request including the target audio and video data stream by an executing body of the method for processing an audio and video (for example, the audio and video data processing module provided in the mobile terminal mentioned in the above system architecture).

In addition to the form of directly including the target audio and video data stream in the request, there are also cases where the target audio and video data stream is not directly included. In this case, the target processing request may indicate how the continuous target audio and video stream may be input, or inform the above executing body where to acquire the target audio and video data stream.

The target processing request is usually initiated by a user who needs to process audio and video data. An initiation method is not limited to clicking directly on a touch screen, issuing a voice instruction, forwarding a control command to the executing body through other devices, or the like.

Step 102: determining a target audio and video pipeline corresponding to the target processing request.

On the basis of step 101, the purpose of this step is to determine the target audio and video pipeline corresponding to the target processing request by the executing body.

The audio and video pipeline described in the present disclosure is a new audio and video pipeline constituted based on a plurality of functional components arranged in a chain structure, and the functional components are uniformly dispatched input data and recovered output data by a preset data stream dispatching module, which is different from the conventional existing audio and video pipeline in which a functional component executed earlier on a time sequence chain directly calls a functional components executed later.

The data stream dispatching module may be implemented based on a Dispatcher mechanism. The Dispatcher mechanism may be understood as an event dispatching mechanism, and a functional module embodying this mechanism may be named as an event dispatcher. For example, Symfony EventDispatcher is an event dispatcher that is applied in a plug-in system so that the system and plug-ins are not coupled together.

The present disclosure also uses this mechanism to decouple the functional components in the existing audio and video pipeline, that is, to control each functional component to send audio and video data processed by itself to the data stream dispatching module, and the data stream dispatching module dispatches the audio and video data received by itself to the next functional module according to a sequence on the chain. Therefore, in the chain pipeline provided by the present disclosure, the functional components do not need to understand, just to perform their own essential work. To put it simply, for each functional component, data is processed upon receipt, and then output to the unified data stream dispatching module, it does not need to care about other functional components, which fully realizes the decoupling between the functional components.

In addition, different audio and video pipelines often correspond to different processing purposes. For example, in order to realize the purposes of converting video footage to grayscale, beautifying, and enlarging a certain area, they may correspond to 3 different audio and video pipelines respectively, and different audio and video pipelines are often composed of different functional components for different processing purposes. In order to be able to determine the target audio and video pipeline corresponding to the target processing request in this step, the processing request may also be required to record its processing purpose in a preset field in a format that is easy to identify. Of course, other information may also be recorded in the processing request according to the actual situation.

Step 103: calling the target audio and video pipeline to continuously process the target audio and video data stream, and continuously outputting a processed audio and video data stream obtained after processing.

On the basis of step 102, the purpose of this step is to call the target audio and video pipeline by the executing body to continuously process the target audio and video data stream, and transmit the processed audio and video data stream that is continuously output after being processed by the target audio and video pipeline to a display unit, such as a display screen, or speaker, of the mobile terminal.

In order to better process audio and video data on a mobile terminal device, the method for processing an audio and video provided by an embodiment of the present disclosure provides a new audio and video pipeline construction scheme in which a plurality of functional components for processing audio and video data streams are arranged in a chain structure, and a preset data stream dispatching module is used to uniformly dispatch input data to the functional components on the chain and recover output data. By controlling a unified dispatching mechanism provided by the data stream dispatching module, the method may decouple the functional components in an execution sequence, without the need to execute a functional component earlier in the sequence to call a functional component later in the sequence, so that functional components only need to focus on their own data processing. It not only improves the processing efficiency of audio and video streams, but also reduces the complexity of operation and maintenance. At the same time, the flow of audio and video streams between the functional components can also be better monitored through the data stream dispatching module.

Figure 2:
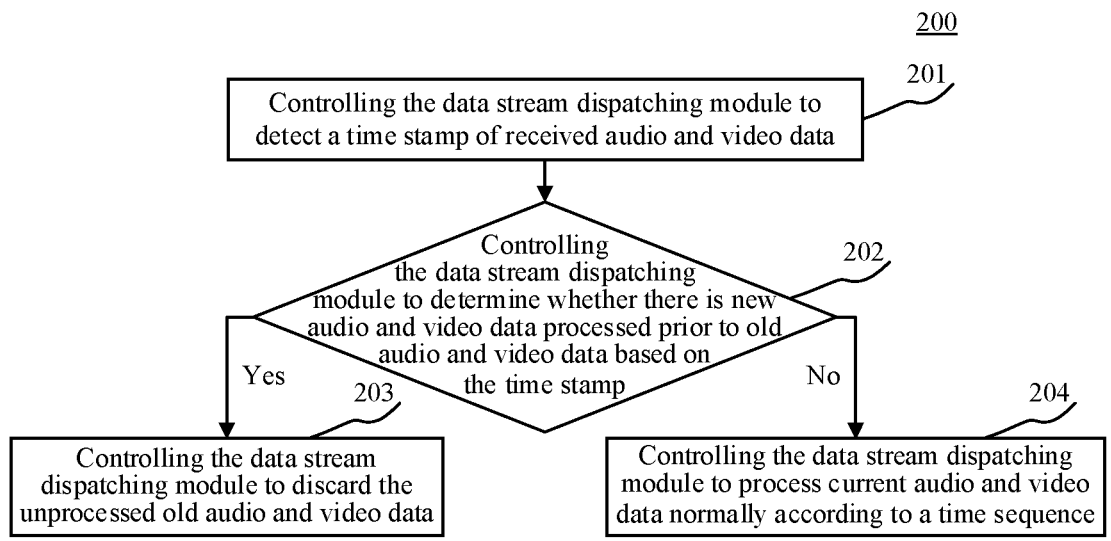
FIG. 2 is a flowchart of a method for asynchronously processing audio and video data according to an embodiment of the present disclosure.

In order to reflect the advantage that the functional components in the new audio and video pipeline provided by the above embodiment of the present disclosure are uniformly dispatched input data and recovered output data by the preset data stream dispatching module, the present embodiment provides an asynchronous processing scheme implemented by means of the data stream dispatching module in conjunction with FIG. 2, so as to avoid invalid processing of invalid audio and video frames through the asynchronous processing scheme, thereby reducing the problem of large jumps in the screen content, where a flow 200 includes the following steps.

Step 201: controlling the data stream dispatching module to detect a time stamp of received audio and video data.

Usually, a dispatching unit of the data stream dispatching module is frame, that is, one audio and video data frame is dispatched each time, and a time stamp attached to each audio and video data frame is able to indicate generation time of the audio and video data frame, and a generated duration is calculated from this.

Of course, the possibility of using other dispatching units is not excluded, for example, dispatching audio and video clips of 1-second each time.

Step 202: controlling the data stream dispatching module to determine whether there is new audio and video data processed prior to old audio and video data based on the time stamp.

The new audio and video data and the old audio and video data correspond to a same generating source, and a generated duration of the new audio and video data is shorter than a generated duration of the old audio and video data.

On the basis of step 201, the purpose of this step is to control the data stream dispatching module by the executing body to determine whether there is the new audio and video data processed prior to the old audio and video data based on the detected time stamp, so as to select different processing branches based on a judgment result.

It should be noted that, in most cases, the audio and video processing framework processes streaming audio and video data synchronously, that is, it strictly follows the chronological order, a first one sent and instructed for processing must be carried out first, and a subsequent one must be carried out later, but it ignores an abnormal situation that may sometimes be caused by "jitter" of a central processing unit or other problems that cause a thread to be stuck in execution. In this abnormal situation, it may cause a later-generated audio and video frame to be processed prior to an earlier-generated audio and video frame by the same functional component. For example, a second image frame captured by a camera at 10 minutes 01 seconds is processed by a grayscale conversion component prior to a first image frame captured by the camera at 09 minutes 58 seconds.

In the above case, for the grayscale conversion component, the second image frame comes first, but the first image frame comes later, so this will eventually lead to the situation presented on the display is: the user feels that the image content skips frames and rewinds.

To solve this problem, the present embodiment makes full use of the data stream dispatching module to determine whether the above problem exists based on the time stamp, and provides a more reasonable processing method when the problem is found to be exist.

Step 203: controlling the data stream dispatching module to discard the unprocessed old audio and video data.

This step is based on the fact that the judgment result in step 202 is that the new audio and video data is processed prior to the old audio and video data. Therefore, in order to avoid the situation of "frame skipping and rewinding", the executing body may control the data stream dispatching module to no longer dispatch the old audio and video data and discard it.

Further, when a time stamp difference of continuous frames of audio and video data used for picture presentation exceeds a preset duration, coherence processing may also be performed on a picture content of the continuous frames of audio and video data, so as to eliminate a sense of frame skipping as much as possible.

Step 204: controlling the data stream dispatching module to process current audio and video data normally according to a time sequence.

This step is based on the fact that the judgment result in step 202 is that no new audio and video data is processed prior to the old audio and video data, so the executing body may control the data stream dispatching module to process the current audio and video data normally according to the time sequence.

Figure 3:
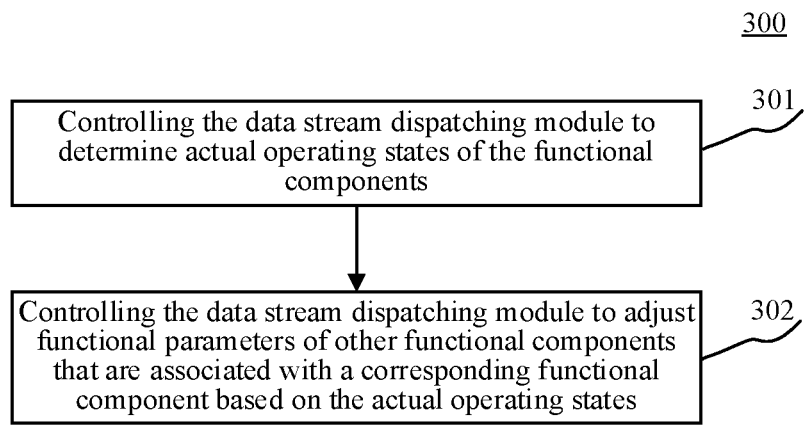
FIG. 3 is a flowchart of a method for determining a operating state of a functional component according to an embodiment of the present disclosure.

In order to reflect the advantage that the functional components in the new audio and video pipeline provided by the above embodiments of the present disclosure are uniformly dispatched input data and recovered output data by the preset data stream dispatching module, the present embodiment provides an implementation scheme through FIG. 3 to highlight that the data stream dispatching module may determine actual operating states of the functional components based on the flow of audio and video streams between the functional components, so as to realize an effect of better fine-tuning in the pipeline based on the actual operating states, where a flow 300 includes the following steps.

Step 301: controlling the data stream dispatching module to determine actual operating states of the functional components.

In particular, the data stream dispatching module may determine the actual operating states of the functional components in various methods. For example, the data stream dispatching module may determine the actual operating states by a time difference between a time of dispatching the input data to the functional components and a time of recovering the output data from the functional components. The data stream dispatching module may also determine the actual operating states of the functional components through accumulation and suspension of the dispatched input data by the functional components. The data stream dispatching module may also determine the actual operating states by checking the correctness and validity of the output data, or the like.

According to the actual situation, a determination method that best meets the needs of the actual situation may be selected.

Step 302: controlling the data stream dispatching module to adjust functional parameters of other functional components that are associated with a corresponding functional component based on the actual operating states.

On the basis of step 301, the purpose of this step is to control the data stream dispatching module by the executing body to adjust the functional parameters of the other functional components that are associated with the corresponding functional component based on the actual operating states.

Because each pipeline is obtained by arranging different functional components therein in a chain structure, the association relationship is mainly reflected in its upstream or downstream, and the adjustable functional parameters involved may include: various parameters such as a sampling rate, an encoding rate, a processing efficiency, a resolution, and a quantity that can affect the processing efficiency.

Further, if the actual operating state exceeds an adjustment upper limit of the functional parameters (that is, the actual operating state of a certain functional component is so poor that it is difficult to solve by adjusting the functional component), the data stream dispatching module may also be controlled to report a notification that the functional component is abnormal, in order to seek a more targeted and more direct functional component repair strategy.

Figure 4:
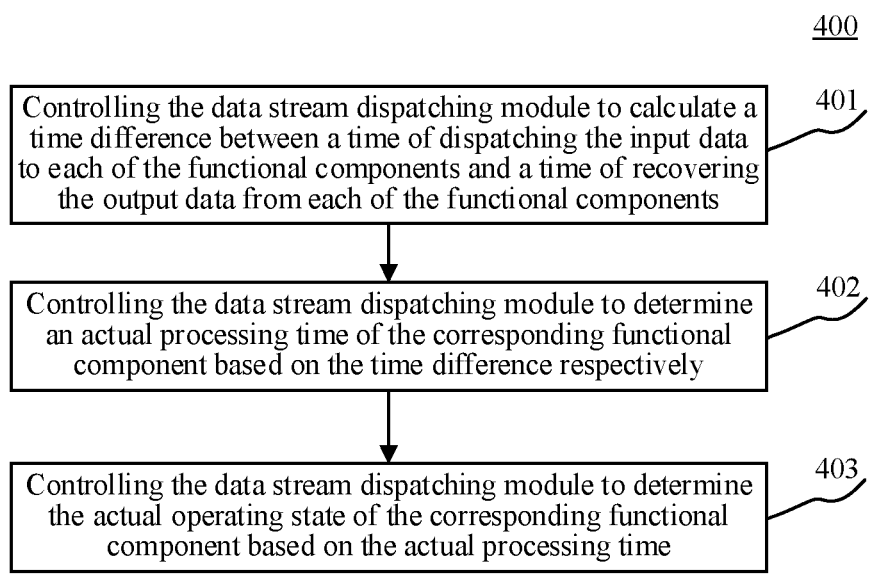
FIG. 4 is a flowchart of a method for determining a operating state of a functional component based on processing time according to an embodiment of the present disclosure.

FIG. 4 is a flowchart of a method for determining an operating state of a functional component based on processing time mentioned in the embodiment shown in FIG. 3, where a flow 400 includes the following steps.

Step 401: controlling the data stream dispatching module to calculate a time difference between a time of dispatching the input data to each of the functional components and a time of recovering the output data from each of the functional components.

Step 402: controlling the data stream dispatching module to determine an actual processing time of the corresponding functional component based on the time difference respectively.

Step 403: controlling the data stream dispatching module to determine the actual operating state of the corresponding functional component based on the actual processing time.

An implementation may be including but not limited to: determining whether the actual processing time is in a normal processing time interval corresponding to the same functional component; in response to the actual processing time being in the normal processing time interval corresponding to the same functional component, controlling the data stream dispatching module to determine that the functional component corresponding to the actual processing time is in normal operating state; or in response to the actual processing time being not in the normal processing time interval corresponding to the same functional component, controlling the data stream dispatching module to determine that the functional component corresponding to the actual processing time is in abnormal operating state.

The normal processing time interval is determined and obtained based on a historical processing time condition of the same functional component that is in normal operating state.

In addition to the above method of determining whether the actual processing time is within a certain interval, a critical value may alternatively be directly set to simplify the judgment step. The critical value may be an upper limit of the normal processing time interval, or may alternatively be determined in other methods, which is not determined herein.

On the basis of any of the above embodiments, according to actual needs, the audio and video pipeline may also be divided into two or more types: single audio and video pipeline and composite audio and video pipeline, where the composite audio and video pipeline is obtained by encapsulating based on a plurality of the single audio and video pipelines, to provide a caller with more convenient calling operations (that is, to improve ease of use) through this encapsulation. For example, an advanced beauty function actually involves a plurality of different image processing on face images, such as improving image brightness, magnifying eyes, removing image noise, reshaping part of image content. If no secondary encapsulation is performed, then each of the above processing items corresponds to a single audio and video pipeline, which requires multiple calling operations before and after, however, after the encapsulation, only one calling interface needs to be presented to the outside.

Figure 5:
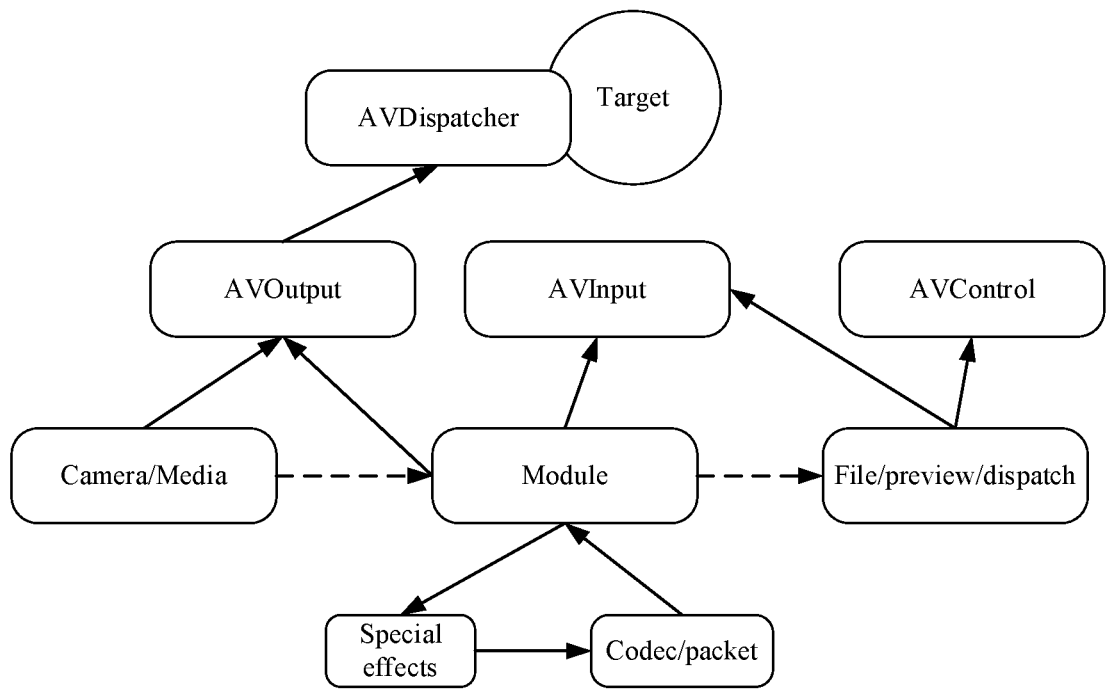
FIG. 5 is a schematic structural diagram of an audio and video processing framework according to an embodiment of the present disclosure.

In order to deepen understanding, the present disclosure also provides an implementation scheme in combination with an application scenario, referring to a schematic structural diagram of an audio and video processing framework as shown in FIG. 5.

By thinking about the structure of the existing GPUImage (an open source image processing library or image processing framework), the present embodiment may first design goals as follows for a new audio and video processing framework: the protocol is relatively simple, is relatively easy to use, is friendly to developers and supports asynchronous processing of audio and video data, scheduling is safe and link configuration is simple and reliable.

In order to achieve the above design goals, the present embodiment still chooses chaining as a core idea of the new audio and video processing framework, and constructs the new audio and video pipeline based on this core idea.

First, a data protocol is formulated so that data between basic functional components can be transmitted efficiently and stably. As shown in FIG. 5, an AVOutput (which may be literally translated as audio and video output) module and an AVInput (which may be literally translated as audio and video input) module are provided to construct a transmission and reception protocol of the data, and simply record and manage the functional components in this chain, and name them as Target. Then, through the mechanism of Dispatcher, video frames reported from a production end (i.e., Camera/media in FIG. 5, that is, camera/multimedia) are dispatched, and the video frames are continuously transmitted to the Targets of each link, and each Target implements the protocol method in the AVInput. For example, in two functions of frame and type, the type function is used to distinguish audio from video in some audio and video.

Then, it is also designed to support dispatch of some binary scenarios, mainly to do some protocol upgrades to match scenarios such as live streaming that requires data dispatch. At the very end of the chain, an AVControl module (which may be literally translated as audio and video control) is implemented, and a control protocol is built into the AVControl module, which is mainly for more refined control of the inflow and outflow of data, in order to avoid the problem of unstable operation of the entire SDK due to the abnormality of a certain module but there is no mechanism to protect it in the process of continuous and continuous transmission of audio and video streams. For example, if the network is found to be jittery when dispatching in a live streaming scenario, the AVControl module may be used to adjust a sending rate, a speed, etc.

In addition, middleware based on secondary encapsulation is also designed according to actual needs.

This is because it is found that the simply designed single audio and video pipeline is not very helpful for business scenario development. Because it only solves the problem of data transmission between the modules, but cannot solve all the problems in the scenario development and landing of the final product. Because a scenario is very different from a module, as the public knows, like on-demand, live streaming, or even special effects, it is actually an ability of generality. However, an actual scenario involves the combination of the modules, so the transmission of data does not mean that a scenario can be chained together by transmitting a piece of data.

For example, for image quality optimization of on-demand, it may be found that type conversion is not so smooth and simple. For a microphone connecting scenario, how to make the product easier to use is very important; for face special effects, for example, it involves the diversification of capabilities, how to achieve compatibility, etc., and these are not just solved by data link or module loading. Therefore, the present embodiment refers to a concept of middleware (equivalent to the composite audio and video pipeline mentioned in the above embodiment), that is, audio and video data are bridged to realize resource sharing. When each module or business is output or used, the applicability of overall data collection or processing can be improved. This part is mainly used to combine the practical application level.

Figure 6:
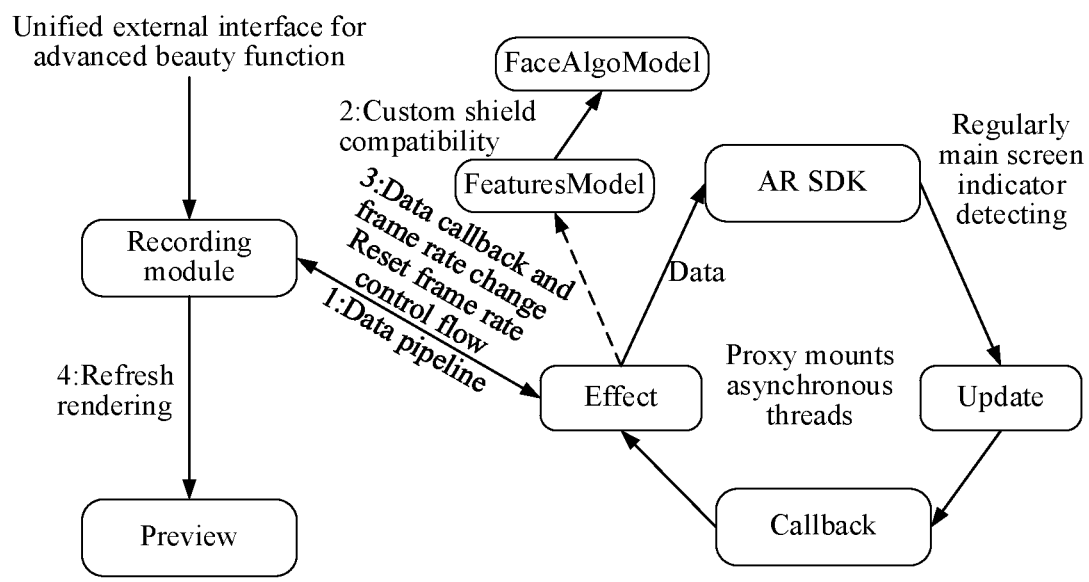
FIG. 6 is a schematic structural diagram of an encapsulated special effect middleware according to an embodiment of the present disclosure.

Using a special effect middleware used to realize an advanced beauty function shown in FIG. 6 as an example, how it work may be described below in detail.

A special effect module is usually a typical PaaS (Platform as a Service) structure. There are a plurality of models on the structure, and the models may be plugged and unplugged; another feature of the structure is that it consumes resources.

The present embodiment makes better use of this module in an audio and video SDK, and a method for providing the corresponding function to the outside is as follows.

Using an advanced beauty interface of face special effects as an example, there are many feature points involved in advanced beauty, such as big eyes, thin face, chin, and these feature points cannot be solved by one iteration or one model. It may involve multiple iterations and a combined stacking of a plurality of models. This may bring a problem. When integrating the special effects module, if these capabilities are constantly changing, there is an unsafe and unstable factor for the use of the module.

First, when calling the capabilities, instead of calling them directly, abstracting and encapsulating these capabilities, and then these encapsulated models are used to associate some different algorithms behind. Because when an actual user uses the SDK, it is not necessary to integrate all the capabilities, and the user may only use some of the capabilities, which may result in inconsistent versions of some special effects SDKs. Without this proxy layer, when there is a version inconsistency, there may be a large number of interface adjustments and modifications for an upper layer, which may be time-consuming and labor-intensive.

Through the data pipeline, we may see that when data is transmitted from a recording module to an Effect interface, then sent to an AR SDK (software development kit for augmented reality), each AR SDK may have a capability of processing and detecting, and the AR SDK may regularly detect main screen indicators, etc., to ensure the processing of each frame and the stability of the overall link with the help of the capability of processing and detecting. An UpDate module is used to continuously receive new incoming image data, and a Callback module is used to implement the judgment mentioned in the above embodiments, a judgment of whether a new image frame is processed prior to an old image frame, and a discarding operation, so as to realize asynchronous control.

That is, by continuously monitoring some performance indicators, the monitoring of these indicators needs to be continuously fed back to upper-layer callings. For example, a current data transmission speed is relatively fast, or there are too many frames to be processed, so the data may be transmitted back through the data pipeline for control. It may even adjust a frame rate captured by the recording module, in this way the data is returned to the recording module, and the recording module then transmits the data to other modules, such as previewing for rendering. Through the solution of data pipeline plus proxy, different AR versions and capabilities may be well integrated, and the interface may be kept unified to the outside.

In the present embodiment, through the capability of opening its own data pipeline, the user may integrate data into the data pipeline in a more stable (by adding the asynchronous processing solution to the synchronous processing solution) and more efficient way and implement functions. In addition, compared with open source products, it may provide a more concise and easy-to-understand access solution, so that implementation and maintenance costs for users are relatively reduced. Secondly, compared with open source data pipelines, the present embodiment introduces a control interface, which may more conveniently control the flow of data in the pipeline, may control the flow of data between modules from a low-level interface, providing users with more possible business designs. Finally, the data pipeline provides some best practices for encapsulating middleware, helps users get through the data flow between modules, while these middleware have been repeatedly verified, having controllable quality and performance, may reduce the cost of secondary development for customers.

Figure 7:
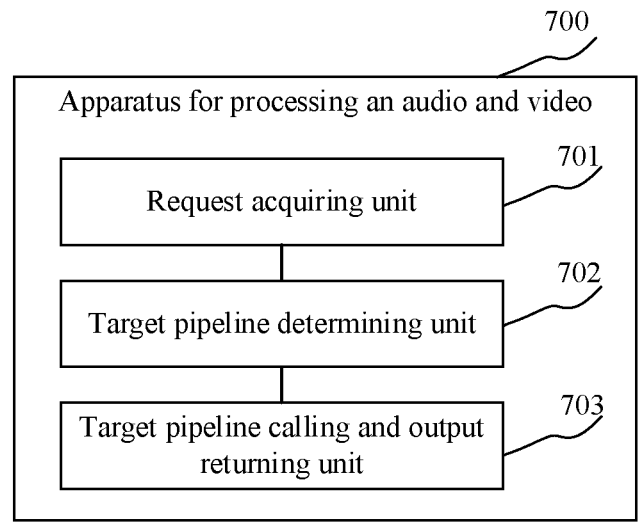
FIG. 7 is a structural block diagram of an apparatus for processing an audio and video according to an embodiment of the present disclosure.

With further reference to FIG. 7, as an implementation of the method shown in the above figures, an embodiment of the present disclosure provides an apparatus for processing an audio and video. The embodiment of the apparatus corresponds to the embodiment of the method shown in FIG. 1, and the apparatus is particularly applicable to various electronic devices.

As shown in FIG. 7, the apparatus 700 for processing an audio and video of the present embodiment may include: a request acquiring unit 701, a target pipeline determining unit 702, a target pipeline calling and output returning unit 703. The request acquiring unit 701 is configured to acquire a target processing request including a target audio and video data stream. The target pipeline determining unit 702 is configured to determine a target audio and video pipeline corresponding to the target processing request; the audio and video pipeline being constituted based on a plurality of functional components arranged in a chain structure, and the functional components being uniformly dispatched input data and recovered output data by a preset data stream dispatching module. The target pipeline calling and output returning unit 703 is configured to call the target audio and video pipeline to continuously process the target audio and video data stream, and continuously output a processed audio and video data stream obtained after processing.

In the present embodiment, in the apparatus 700 for processing an audio and video: for the specific processing and the technical effects of the request acquiring unit 701, the target pipeline determining unit 702, and the target pipeline calling and output returning unit 703, reference may be made to the relevant descriptions of steps 101-103 in the corresponding embodiment of FIG. 1, respectively, and detailed description thereof will be omitted.

In some alternative implementations of the present embodiment, the apparatus 700 for processing an audio and video may further include: a time stamp detecting unit, configured to control the data stream dispatching module to detect a time stamp of received audio and video data; and an asynchronous processing unit, configured to, in response to determining that new audio and video data is processed prior to old audio and video data based on the time stamp, discard the unprocessed old audio and video data; where the new audio and video data and the old audio and video data correspond to a same generating source, and a generated duration of the new audio and video data is shorter than a generated duration of the old audio and video data.

In some alternative implementations of the present embodiment, the apparatus 700 for processing an audio and video may further include: a coherence processing unit, configured to, in response to a time stamp difference of continuous frames of audio and video data used for picture presentation exceeding a preset duration, perform coherence processing on a picture content of the continuous frames of audio and video data.

In some alternative implementations of the present embodiment, the apparatus 700 for processing an audio and video may further include: a component operating state determining unit, configured to control the data stream dispatching module to determine actual operating states of the functional components; and a functional parameter adjusting unit, configured to control the data stream dispatching module to adjust functional parameters of other functional components that are associated with a corresponding functional component based on the actual operating states.

In some alternative implementations of the present embodiment, the functional parameter adjusting unit include: a time difference calculating subunit, configured to control the data stream dispatching module to calculate a time difference between a time of dispatching the input data to each of the functional components and a time of recovering the output data from each of the functional components; an actual processing time determining subunit, configured to control the data stream dispatching module to determine an actual processing time of the corresponding functional component based on the time difference respectively; and an actual operating state determining subunit, configured to control the data stream dispatching module to determine the actual operating state of the corresponding functional component based on the actual processing time.

In some alternative implementations of the present embodiment, the actual operating state determining subunit is further configured to: in response to the actual processing time being in a normal processing time interval corresponding to the same functional component, control the data stream dispatching module to determine that the functional component corresponding to the actual processing time is in normal operating state; where the normal processing time interval is determined and obtained based on a historical processing time condition of the same functional component that is in normal operating state; or in response to the actual processing time being not in a normal processing time interval corresponding to the same functional component, control the data stream dispatching module to determine that the functional component corresponding to the actual processing time is in abnormal operating state.

In some alternative implementations of the present embodiment, the apparatus 700 for processing an audio and video may further include: an abnormality notification reporting unit, configured to control, in response to the actual operating state exceeding an adjustment upper limit of the functional parameters, the data stream dispatching module to report a notification that the functional component is abnormal.

In some alternative implementations of the present embodiment, the target audio and video pipeline includes a single audio and video pipeline and a composite audio and video pipeline, and the composite audio and video pipeline is obtained by encapsulating based on a plurality of the single audio and video pipelines.

The present embodiment exists as the apparatus embodiment corresponding to the above method embodiment.

In order to better process audio and video data on a mobile terminal device, the apparatus for processing an audio and video provided by an embodiment of the present disclosure, with the help of the above functional units, provides a new audio and video pipeline construction scheme in which a plurality of functional components for processing audio and video data streams are arranged in a chain structure, and a preset data stream dispatching module is used to uniformly dispatch input data to the functional components on the chain and recover output data. By controlling a unified dispatching mechanism provided by the data stream dispatching module, the apparatus may decouple the functional components in an execution sequence, without the need to execute a functional component earlier in the sequence to call a functional component later in the sequence, so that functional components only need to focus on their own data processing. It not only improves the processing efficiency of audio and video streams, but also reduces the complexity of operation and maintenance. At the same time, the flow of audio and video streams between the functional components can also be better monitored through the data stream dispatching module.

According to an embodiment of the present disclosure, the present disclosure also provides an electronic device, the electronic device including: at least one processor; and a memory communicatively connected to the at least one processor. The memory stores instructions executable by the at least one processor, and the instructions, when executed by the at least one processor, cause the at least one processor to perform the method for processing an audio and video described in any of the foregoing embodiments.

According to an embodiment of the present disclosure, the present disclosure also provides a readable storage medium storing computer instructions. The computer instructions are used to cause the computer to implement the method for processing an audio and video described in any of the foregoing embodiments.

An embodiment of the present disclosure provides a computer program product. The computer program product, when executed by a processor, can implement the method for processing an audio and video described in any of the foregoing embodiments.

Figure 8:
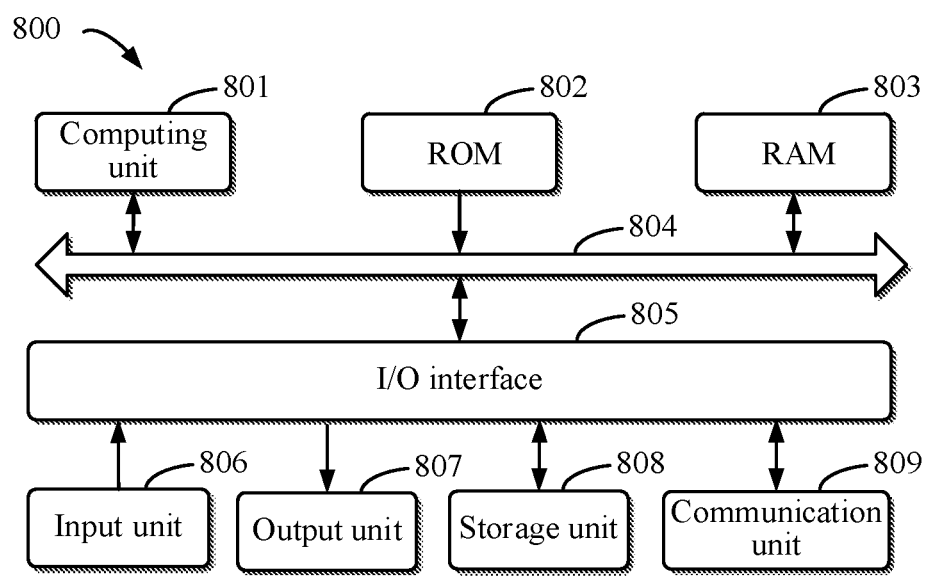
FIG. 8 is a schematic structural diagram of an electronic device suitable for performing the method for processing an audio and video according to an embodiment of the present disclosure.

FIG. 8 illustrates a schematic block diagram of an example electronic device 800 for implementing the embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the device 800 includes a computing unit 801, which may perform various appropriate actions and processing, based on a computer program stored in a read-only memory (ROM) 802 or a computer program loaded from a storage unit 808 into a random access memory (RAM) 803. In the RAM 803, various programs and data required for the operation of the device 800 may also be stored. The computing unit 801, the ROM 802, and the RAM 803 are connected to each other through a bus 804. An input/output (I/O) interface 805 is also connected to the bus 804.

A plurality of parts in the device 800 are connected to the I/O interface 805, including: an input unit 806, for example, a keyboard and a mouse; an output unit 808, for example, various types of displays and speakers; the storage unit 808, for example, a disk and an optical disk; and a communication unit 809, for example, a network card, a modem, or a wireless communication transceiver. The communication unit 809 allows the device 800 to exchange information/data with other devices over a computer network such as the Internet and/or various telecommunication networks.

The computing unit 801 may be various general-purpose and/or dedicated processing components having processing and computing capabilities. Some examples of the computing unit 801 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 801 performs the various methods and processes described above, such as the method for processing an audio and video. For example, in some embodiments, the method for processing an audio and video may be implemented as a computer software program, which is tangibly included in a machine readable medium, such as the storage unit 808. In some embodiments, part or all of the computer program may be loaded and/or installed on the device 800 via the ROM 802 and/or the communication unit 809. When the computer program is loaded into the RAM 803 and executed by the computing unit 801, one or more steps of the method for processing an audio and video described above may be performed. Alternatively, in other embodiments, the computing unit 801 may be configured to perform the method for processing an audio and video by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in the cloud computing service system to solve the defects, such as complex management and weak business expansion, in traditional physical host and virtual private server (VPS) services.

In order to better process audio and video data on a mobile terminal device, the present disclosure provides a new audio and video pipeline construction scheme in which a plurality of functional components for processing audio and video data streams are arranged in a chain structure, and a preset data stream dispatching module is used to uniformly dispatch input data to the functional components on the chain and recover output data. By controlling a unified dispatching mechanism provided by the data stream dispatching module, the scheme may decouple the functional components in an execution sequence, without the need to execute a functional component earlier in the sequence to call a functional component later in the sequence, so that functional components only need to focus on their own data processing. It not only improves the processing efficiency of audio and video streams, but also reduces the complexity of operation and maintenance. At the same time, the flow of audio and video streams between the functional components can also be better monitored through the data stream dispatching module.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for processing an audio and video, the method comprising:
    acquiring a target processing request including a target audio and video data stream, wherein the target processing request records a processing purpose in a preset field in a format that is easy to identify;
    determining a target audio and video pipeline corresponding to the target processing request; the audio and video pipeline being constituted based on a plurality of functional components arranged in a chain structure, and the functional components being uniformly dispatched input data and recovered output data by a preset data stream dispatching module;
    calling the target audio and video pipeline to continuously process the target audio and video data stream, and continuously outputting a processed audio and video data stream obtained after processing;
    controlling the data stream dispatching module to detect a time stamp of received audio and video data; and
    in response to determining that new audio and video data is processed prior to old audio and video data based on the time stamp, discarding the unprocessed old audio and video data; wherein the new audio and video data and the old audio and video data correspond to a same generating source, and a generated duration of the new audio and video data is shorter than a generated duration of the old audio and video data.

2. The method according to claim 1, further comprising:
    in response to a time stamp difference of continuous frames of audio and video data used for picture presentation exceeding a preset duration, processing a picture content of the continuous frames of audio and video data to eliminate a sense of frame skipping.

3. The method according to claim 1, further comprising:
    controlling the data stream dispatching module to determine actual operating states of the functional components; and
    controlling the data stream dispatching module to adjust functional parameters of other functional components that are associated with a corresponding functional component based on the actual operating states.

4. The method according to claim 3, wherein controlling the data stream dispatching module to determine actual operating states of the functional components, comprises:
- controlling the data stream dispatching module to calculate a time difference between a time of dispatching the input data to each of the functional components and a time of recovering the output data from each of the functional components;
- controlling the data stream dispatching module to determine an actual processing time of the corresponding functional component based on the time difference respectively; and
- controlling the data stream dispatching module to determine the actual operating state of the corresponding functional component based on the actual processing time.

5. The method according to claim 4, wherein controlling the data stream dispatching module to determine the actual operating state of the corresponding functional component based on the actual processing time, comprises:
- in response to the actual processing time being in a normal processing time interval corresponding to a same functional component, controlling the data stream dispatching module to determine that the functional component corresponding to the actual processing time is in normal operating state; wherein the normal processing time interval is determined and obtained based on a historical processing time condition of the same functional component that is in normal operating state; or
- in response to the actual processing time being not in a normal processing time interval corresponding to the same functional component, controlling the data stream dispatching module to determine that the functional component corresponding to the actual processing time is in abnormal operating state.

6. The method according to claim 3, further comprising:
- in response to the actual operating state exceeding an adjustment upper limit of the functional parameters, controlling the data stream dispatching module to report a notification that the functional component is abnormal.

7. The method according to claim 1, wherein, the target audio and video pipeline comprises a single audio and video pipeline and a composite audio and video pipeline, and the composite audio and video pipeline is obtained by encapsulating based on a plurality of the single audio and video pipelines.

8. An electronic device, comprising:
- at least one processor; and
- a memory communicatively connected to the at least one processor;
- wherein the memory stores instructions executable by the at least one processor, and the instructions, when executed by the at least one processor, cause the at least one processor to perform operations, the operations comprising:
  - acquiring a target processing request including a target audio and video data stream, wherein the target processing request records a processing purpose in a preset field in a format that is easy to identify;
  - determining a target audio and video pipeline corresponding to the target processing request; the audio and video pipeline being constituted based on a plurality of functional components arranged in a chain structure, and the functional components being uniformly dispatched input data and recovered output data by a preset data stream dispatching module;
  - calling the target audio and video pipeline to continuously process the target audio and video data stream, and continuously outputting a processed audio and video data stream obtained after processing;
  - controlling the data stream dispatching module to detect a time stamp of received audio and video data; and
  - in response to determining that new audio and video data is processed prior to old audio and video data based on the time stamp, discarding the unprocessed old audio and video data; wherein the new audio and video data and the old audio and video data correspond to a same generating source, and a generated duration of the new audio and video data is shorter than a generated duration of the old audio and video data.

9. The electronic device according to claim 8, wherein the operations further comprise:
- in response to a time stamp difference of continuous frames of audio and video data used for picture presentation exceeding a preset duration, processing a picture content of the continuous frames of audio and video data to eliminate a sense of frame skipping.

10. The electronic device according to claim 8, wherein the operations further comprise:
- controlling the data stream dispatching module to determine actual operating states of the functional components; and
- controlling the data stream dispatching module to adjust functional parameters of other functional components that are associated with a corresponding functional component based on the actual operating states.

11. The electronic device according to claim 10, wherein controlling the data stream dispatching module to determine actual operating states of the functional components, comprises:
- controlling the data stream dispatching module to calculate a time difference between a time of dispatching the input data to each of the functional components and a time of recovering the output data from each of the functional components;
- controlling the data stream dispatching module to determine an actual processing time of the corresponding functional component based on the time difference respectively; and
- controlling the data stream dispatching module to determine the actual operating state of the corresponding functional component based on the actual processing time.

12. The electronic device according to claim 11, wherein controlling the data stream dispatching module to determine the actual operating state of the corresponding functional component based on the actual processing time, comprises:
- in response to the actual processing time being in a normal processing time interval corresponding to a same functional component, controlling the data stream dispatching module to determine that the functional component corresponding to the actual processing time is in normal operating state; wherein the normal processing time interval is determined and obtained based on a historical processing time condition of the same functional component that is in normal operating state; or
- in response to the actual processing time being not in a normal processing time interval corresponding to the same functional component, controlling the data stream dispatching module to determine that the functional component corresponding to the actual processing time is in abnormal operating state.

13. The electronic device according to claim 10, wherein the operations further comprise:
in response to the actual operating state exceeding an adjustment upper limit of the functional parameters, controlling the data stream dispatching module to report a notification that the functional component is abnormal.

14. The electronic device according to claim 8, wherein, the target audio and video pipeline comprises a single audio and video pipeline and a composite audio and video pipeline, and the composite audio and video pipeline is obtained by encapsulating based on a plurality of the single audio and video pipelines.

15. A non-transitory computer readable storage medium storing computer instructions, wherein, the computer instructions, when executed by a processor, cause the processor to perform operations, the operations comprising:
acquiring a target processing request including a target audio and video data stream, wherein the target processing request records a processing purpose in a preset field in a format that is easy to identify;
determining a target audio and video pipeline corresponding to the target processing request; the audio and video pipeline being constituted based on a plurality of functional components arranged in a chain structure, and the functional components being uniformly dispatched input data and recovered output data by a preset data stream dispatching module;
calling the target audio and video pipeline to continuously process the target audio and video data stream, and continuously outputting a processed audio and video data stream obtained after processing;
controlling the data stream dispatching module to detect a time stamp of received audio and video data; and
in response to determining that new audio and video data is processed prior to old audio and video data based on the time stamp, discarding the unprocessed old audio and video data; wherein the new audio and video data and the old audio and video data correspond to a same generating source, and a generated duration of the new audio and video data is shorter than a generated duration of the old audio and video data.

16. The non-transitory computer readable storage medium according to claim 15, wherein the operations further comprise:
in response to a time stamp difference of continuous frames of audio and video data used for picture presentation exceeding a preset duration, processing a picture content of the continuous frames of audio and video data to eliminate a sense of frame skipping.

17. The non-transitory computer readable storage medium according to claim 15, wherein the operations further comprise:
controlling the data stream dispatching module to determine actual operating states of the functional components; and
controlling the data stream dispatching module to adjust functional parameters of other functional components that are associated with a corresponding functional component based on the actual operating states.

* * * * *